United States Patent
Kuwakino et al.

(10) Patent No.: US 9,921,455 B2
(45) Date of Patent: Mar. 20, 2018

(54) DIAPHRAGM DEVICE FOR VIDEO CAMERA LENS AND METHOD FOR CONTROLLING DIAPHRAGM DEVICE

(71) Applicant: FUJIFILM Corporation, Tokyo (JP)

(72) Inventors: Koshi Kuwakino, Saitama (JP); Akinori Hamana, Saitama (JP); Kouichi Nagata, Saitama (JP); Shinichi Yamamoto, Saitama (JP); Hiroshi Nakamura, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 379 days.

(21) Appl. No.: 14/869,031

(22) Filed: Sep. 29, 2015

(65) Prior Publication Data
US 2016/0018717 A1    Jan. 21, 2016

Related U.S. Application Data

(63) Continuation of application No. PCT/JP2013/078524, filed on Oct. 22, 2013.

(30) Foreign Application Priority Data

Mar. 29, 2013  (JP) ................................ 2013-073946

(51) Int. Cl.
*G03B 9/07* (2006.01)
*G03B 7/20* (2006.01)
(Continued)

(52) U.S. Cl.
CPC .............. *G03B 9/07* (2013.01); *G02B 5/005* (2013.01); *G03B 7/20* (2013.01); *G05D 3/10* (2013.01);
(Continued)

(58) Field of Classification Search
None
See application file for complete search history.

(56) References Cited

U.S. PATENT DOCUMENTS 4,636,054 A * 1/1987 Saegusa ............... G03B 7/20
396/234
5,867,737 A * 2/1999 Shiokama ............ G03B 7/20
396/237
(Continued)

FOREIGN PATENT DOCUMENTS

JP    02-030277    1/1990
JP    2001-320617    11/2001
(Continued)

OTHER PUBLICATIONS

International Search Report, PCT/JP2013/078524, dated Feb. 4, 2014.
(Continued)

*Primary Examiner* — W B Perkey
(74) *Attorney, Agent, or Firm* — Young & Thompson (57) ABSTRACT

A diaphragm device includes a diaphragm mechanism, a connector, an identification unit for identifying a control mode of a signal communicated via the multiple terminals on the basis of voltage of the signal, and a control unit, wherein the switching unit switches the communication path so that a pulse signal capable of driving the pulse signal driven actuator is generated for generating the pulse signal on the basis of the signal, and output to the pulse signal driven actuator if the control mode of the signal is identified as one based on a control mode incapable of directly driving the pulse signal driven actuator; and the switching unit switches the communication path so that the signal is output to the pulse signal driven actuator if the control mode of the (Continued)

signal is identified as a first control mode based on a pulse signal directly driving the pulse signal driven actuator.

8 Claims, 5 Drawing Sheets

(51) Int. Cl.
    *H04N 5/238*     (2006.01)
    *G02B 5/00*     (2006.01)
    *H02P 8/00*     (2006.01)
    *G05D 3/10*     (2006.01)
    *H04N 5/232*     (2006.01)

(52) U.S. Cl.
    CPC ............... *H02P 8/00* (2013.01); *H04N 5/238* (2013.01); *H04N 5/23241* (2013.01)

(56) References Cited

U.S. PATENT DOCUMENTS

| | | |
|---|---|---|
| 2002/0015099 A1 | 2/2002 | Igarashi |
| 2011/0076006 A1 | 3/2011 | Hirose |
| 2011/0194851 A1 | 8/2011 | Hjelmstrom |
| 2016/0018717 A1* | 1/2016 | Kuwakino ............... G03B 7/20 359/230 |
| 2016/0119603 A1* | 4/2016 | Hayashi .................. G06T 5/003 348/222.1 |
| 2016/0150161 A1* | 5/2016 | Irie ......................... G06T 5/003 348/229.1 |
| 2017/0108763 A1* | 4/2017 | Hashiguchi .......... G03B 17/566 |

FOREIGN PATENT DOCUMENTS

| | | |
|---|---|---|
| JP | 2003-015185 | 1/2003 |
| JP | 2005-099530 | 4/2005 |
| JP | 2011077643 | 4/2011 |
| JP | 2011-164614 | 8/2011 |

OTHER PUBLICATIONS

Written Opinion, PCT/JP2013/078524, dated Feb. 2, 2014.
International Preliminary Report on Patentability (IPRP) (Chapter I) PCT/JP2013/078524 dated Oct. 8, 2015, with English Translation.

* cited by examiner

| CONNECTOR TERMINAL NUMBER | VIDEO IRIS CONTROL MODE | DC IRIS CONTROL MODE | P-IRIS CONTROL MODE |
|---|---|---|---|
| 1 | +V (POWER SUPPLY) | Damp. − | A PHASE (+A PHASE) |
| 2 | NC | Damp. + | B PHASE (+B PHASE) |
| 3 | VIDEO SIGNAL | Drive + | $\overline{B}$- PHASE (−B PHASE) |
| 4 | GROUND | Drive − | $\overline{A}$- PHASE (−A PHASE) |

DIAPHRAGM DEVICE FOR VIDEO CAMERA LENS AND METHOD FOR CONTROLLING DIAPHRAGM DEVICE

CROSS-REFERENCE TO RELATED APPLICATIONS

This application is a Continuation of PCT International Application No. PCT/JP2013/078524 filed on Oct. 22, 2013, which claims priority under 35 U.S.C § 119(a) to Japanese Patent Application No. 2013-073946 filed on Mar. 29, 2013. Each of the above application(s) is hereby expressly incorporated by reference, in its entirety, into the present application.

BACKGROUND OF THE INVENTION

Field of the Invention

The present invention relates to a diaphragm device for a video camera lens and a method for controlling the diaphragm device, and in particular, to a video camera lens capable of adjusting the amount of diaphragm by an actuator using a pulse signal driven motor.

Description of the Related Art

Imaging devices such as video cameras generally adopt a scheme in which a lens unit comprising a diaphragm mechanism is attached to a camera body.

Regarding such a diaphragm mechanism of the lens unit, a DC iris control mode and a video iris control mode are widely used as an automatic diaphragm control mode to automatically adjust and maintain the amount of light to an image sensor at an appropriate level.

The DC iris control mode and the video iris control mode have in common in that the diaphragm is automatically adjusted by an analog signal driven motor according to change in the luminance of a subject, but are different in that a control circuit is provided in the camera body in the DC iris control mode, whereas a control circuit is provided in the lens unit in the video iris control mode.

Therefore, it is required to use a camera body and a lens unit by appropriately combining them depending on their control modes. However, because a terminal structure between the camera body and the lens unit is common to the DC iris control mode and the video iris control mode, there have been cases where the camera body and the lens unit that are in conformity with different control modes incompatible with each other get connected.

Japanese Patent Application Laid-Open No. 2-030277 (hereinafter referred to as PTL 1) discloses an imaging device maintaining compatibility with both a lens that includes a built-in driving circuit for driving an optical diaphragm mechanism and a lens that does not include a built-in driving circuit. The imaging device of PTL 1 is provided with a second iris driving circuit independent of a first iris driving circuit, a first optical diaphragm mechanism is driven by the first iris driving circuit when a first lens is attached, and a second optical diaphragm mechanism is driven by the second iris driving circuit when a second lens is attached.

In addition, Japanese Patent Application Laid-Open No. 2001-320617 (hereinafter referred to as PTL 2) discloses an interchange connection device that enables use of lenses each including one of two different types of automatic diaphragm mechanisms by letting a user freely insert one of the lenses into a connector at a camera side and connect it with the connector regardless of the types. In the interchange connection device in PTL 2, switching an analog switch by detecting a change in voltage or current at each terminal of the connector enables coping with a VS control automatic diaphragm lens and a DC control automatic diaphragm lens.

On the other hand, nowadays, as a control mode other than the DC iris control mode and the video iris control mode, there have been also used video cameras adopting a so-called P-iris control mode that enables highly accurate control of the amount of diaphragm by a stepping motor.

In relation to the P-iris control mode, for example, Japanese Patent Application Laid-Open No. 2011-164614 (hereinafter referred to as PTL 3) proposes an approach that enables a camera side to use a parameter of a P-iris lens in a calibration method for a camera equipped with the P-iris lens.

SUMMARY OF THE INVENTION

As described above, in addition to the DC iris control mode and the video iris control mode, there have been used lens units equipped with a diaphragm device in the P-iris control mode using a stepping motor in order to perform accurate diaphragm control. On the market, however, there are still lots of video cameras compatible with the video iris control mode and video cameras compatible with the DC iris control mode.

Because these video iris control mode, DC iris control mode, and P-iris control mode have totally different control configurations, it is not possible, for example, to use a lens unit equipped with a diaphragm device in the P-iris control mode for a camera body compatible with the video iris control mode. Therefore, it has been necessary to connect a camera body compatible with the P-iris control mode to a lens unit equipped with a diaphragm device in the P-iris control mode, and thereby to perform diaphragm control in the P-iris control mode.

However, video cameras compatible with the DC iris control mode, video cameras compatible with the video iris control mode, and video cameras compatible with the P-iris control mode are often compatible with each other (commonality) regarding connector shapes between camera bodies and lens units. Therefore, a camera body and a lens unit in mutually incompatible control modes can be simply physically connected. This causes a situation of the connected camera body being unable to perform diaphragm control of the lens in the P-iris control mode.

Especially, the P-iris control mode using a digital signal driven stepping motor is totally different in control modes and control signals from the DC iris control mode and video iris control mode using an analog signal driven motor. Therefore, conventional arts like PTL 1-3 cannot appropriately perform diaphragm control in the P-iris control mode using the stepping motor.

In other words, the arts disclosed in PTL 1 and PTL 2 are applicable to the DC iris control mode and the video iris control mode, but not applicable to the P-iris control mode using the stepping motor in first place because their control modes and control signals are totally different. In addition, PTL 3 is not to give teaching on a specific control approach in the case where a camera body in another control mode gets connected to a lens unit in the P-iris control mode.

The present invention is made in light of the above described situation, and an objective is to provide a technique to appropriately perform diaphragm control in the P-iris control mode on the basis of a control signal in another mode in the case where a camera body in the other mode (such as a DC auto control mode or a video auto control mode) gets connected to a lens unit in a diaphragm control mode using a stepping motor.

One aspect of the present invention is related to a diaphragm device for a video camera lens interchangeably attached to a video camera body outputting a pulse signal for diaphragm control and a video camera body outputting a signal for diaphragm control different from the pulse signal, comprising: a diaphragm mechanism for adjusting an amount of diaphragm of the lens; a pulse signal driven actuator for driving the diaphragm mechanism according to an input pulse signal; a connector connected to the video camera body and including a plurality of terminals enabling communication with the video camera body; an identification unit for identifying a control mode of a signal communicated via the plurality of terminals on the basis of voltage of the signal; and a control unit that includes a switching unit for switching a communication path of the signal depending on the identified control mode and that controls the pulse signal driven actuator by a pulse signal based on the signal, wherein the switching unit switches the communication path so that a pulse signal capable of driving the pulse signal driven actuator is generated by a signal generating unit for generating the pulse signal on the basis of the signal, and output to the pulse signal driven actuator if the control mode of the signal is identified as one based on a control mode incapable of directly driving the pulse signal driven actuator, and the switching unit switches the communication path so that the signal is output to the pulse signal driven actuator if the control mode of the signal is identified as a first control mode based on a pulse signal capable of directly driving the pulse signal driven actuator.

According to the aspect, even if a signal different from the pulse signal is transmitted and received (communicated) via the plurality of terminals (input/output unit), a pulse signal is generated and output from the transmitted and received signal; therefore, even if the communicated signal is a signal different from the pulse signal, drive of the pulse signal driven actuator can be appropriately controlled. Thus, for example, even if the control mode of the signal is identified as a control mode incapable of driving the pulse signal driven actuator, a pulse signal is generated, and the pulse signal can be output to the pulse signal driven actuator.

The pulse signal driven actuator herein is an actuator (for example a motor) driven by input of a pulse signal, and for example, a stepping motor or the like is cited. Thus, a stepping motor that can be used in the so-called P-iris control mode can correspond to the pulse signal driven actuator in the aspect.

Preferably, the control mode incapable of directly driving the pulse signal driven actuator includes a second control mode, the signal therein including a video signal, and a third control mode, the signal therein including a signal to control an analog signal driven actuator.

According to the aspect, the diaphragm mechanism in the control mode (first control mode) in which iris control is performed by the pulse signal driven actuator can be also controlled on the basis of signals of the other control modes (second control mode and third control mode).

Preferably, the plurality of terminals include a first terminal, a second terminal, a third terminal and a fourth terminal; the first control mode enables communication of a signal input into a first phase of the pulse signal driven actuator via the first terminal and the fourth terminal, and enables communication of a signal input into a second phase of the pulse signal driven actuator via the second terminal and the third terminal; the second control mode enables use of the first terminal as a power supply terminal, enables communication of a video signal via the third terminal, and enables use of the fourth terminal as a ground terminal; and the third control mode enables communication of a braking signal via the first terminal and the second terminal, and enables communication of a driving signal via the third terminal and the fourth terminal.

Preferably, the identification unit identifies the control mode of a signal as the first control mode if each of voltage between the first terminal and the fourth terminal and voltage between the second terminal and the third terminal is higher than voltage determined on the basis of voltage of a pulse signal to drive the pulse signal driven actuator and the signal communicated via the first terminal, the second terminal, the third terminal and the fourth terminal is a pulse signal.

Theses aspects enable appropriate identification of whether or not a transmission and reception signal (signal which is communicated) is in conformity with the first control mode.

Preferably, the identification unit identifies the control mode of the signal as the second control mode if the voltage between the first terminal and the fourth terminal is higher than voltage determined on the basis of power supply voltage in the second control mode.

The aspect enables appropriate identification of whether or not the transmission and reception signal (signal which is communicated) is in conformity with the second control mode.

Preferably, the identification unit identifies the control mode of the signal as the third control mode if voltage between the third terminal and the fourth terminal is higher than voltage determined on the basis of driving signal voltage in the third control mode and a signal communicated via the third terminal and the fourth terminal is a direct current signal.

The aspect enables appropriate identification of whether or not the transmission and reception signal (signal which is communicated) is in conformity with the third control mode.

Another aspect of the present invention is related to a method for controlling a diaphragm device for a video camera lens interchangeably attached to a video camera body outputting a pulse signal for diaphragm control and a video camera body outputting a signal for diaphragm control different from the pulse signal, the diaphragm device for the video camera lens comprising: a diaphragm mechanism for adjusting an amount of diaphragm of the lens; a pulse signal driven actuator for driving the diaphragm mechanism according to an input pulse signal; a connector connected to the video camera body and including a plurality of terminals enabling communication with the video camera body; an identification unit for identifying a control mode of a signal communicated via the plurality of terminals on the basis of voltage of the signal; and a control unit that includes a switching unit for switching a communication path of the signal depending on the identified control mode and that controls the pulse signal driven actuator by a pulse signal based on the signal, the method including the steps of: identifying a control mode of a signal communicated via the plurality of terminals on the basis of voltage of the signal; and switching a communication path on the basis of the identified control mode of the signal, wherein the switching unit switches the communication path so that a pulse signal capable of driving the pulse signal driven actuator is generated by a signal generating unit for generating the pulse signal on the basis of the signal, and output to the pulse signal driven actuator if the control mode of the signal is identified as one based on a control mode incapable of directly driving the pulse signal driven actuator, and the switching unit switches the communication path so that the signal is output to the pulse signal driven actuator if the control mode of the signal is identified as a first control mode based on a pulse signal capable of directly driving the pulse signal driven actuator.

Preferably, the plurality of terminals include a first terminal, a second terminal, a third terminal and a fourth terminal; the first control mode enables communication of a signal input into a first phase of the pulse signal driven actuator via the first terminal and the fourth terminal, and enables communication of a signal input into a second phase of the pulse signal driven actuator via the second terminal and the third terminal; the second control mode enables use of the first terminal as a power supply terminal, enables communication of a video signal via the third terminal, and enables use of the fourth terminal as a ground terminal; the third control mode enables communication of a braking signal via the first terminal and the second terminal, and enables communication of a driving signal via the third terminal and the fourth terminal; and the step of identifying the control mode of a signal includes the steps of totally closing the diaphragm once by adjusting the amount of the diaphragm by the diaphragm mechanism, and detecting a signal communicated via the first terminal, the second terminal, the third terminal and the fourth terminal after total closing of the diaphragm.

The aspect enables accurate detection of signal voltage because the step of detecting the signal communicated via the plurality of terminals (input/output unit) is performed after total closing of the diaphragm for the video camera lens, and thereby enables accurate identification of the control mode.

Another aspect of the present invention is related to a diaphragm device for a video camera lens interchangeably attached to a video camera body outputting a pulse signal for diaphragm control and a video camera body outputting a signal for diaphragm control different from the pulse signal, comprising: a diaphragm mechanism for adjusting an amount of diaphragm of the lens; an actuator including a pulse signal driven motor driving the diaphragm mechanism according to an input pulse signal; a connector connected to the video camera body and including a plurality of terminals enabling communication with the video camera body; and a control unit that outputs a pulse signal to the actuator on the basis of a communication signal communicated via the plurality of terminals and that includes an identification unit for identifying a control mode of the communication signal on the basis of voltage of the communication signal and signal processing units for obtaining a pulse signal on the basis of the identified control mode.

The aspect allows drive of the pulse signal driven motor to be appropriately controlled even if the communication signal is a signal different from the pulse signal because a pulse signal is obtained and output by signal processing from the transmitted and received communication signal even if the communication signal different from the pulse signal is transmitted and received (communicated) via the plurality of terminals (input/output unit).

The pulse signal driven motor herein is a motor driven by input of a pulse signal, and for example, a stepping motor or the like is cited. Therefore, a stepping motor usable in the so-called P-iris control mode can correspond to a pulse signal driven motor in the aspect.

Preferably, the control unit includes a switching unit for switching communication path of the signal depending on the identified control mode of the communication signal, and the switching unit switches the communication path so that the communication signal based on the pulse signal is output to the actuator skipping the signal processing units if the control mode of the communication signal is identified as a control mode based on a pulse signal capable of driving the actuator, and switches the communication path so that a pulse signal capable of driving the actuator is output to the actuator obtained by the signal processing units on the basis of the control mode of the communication signal if the control mode of the communication signal is identified as one based on a control mode incapable of driving the actuator.

The aspect enables acquisition of a pulse signal by the signal processing units and output of the pulse signal to the actuator even if the communication signal is identified as a control mode incapable of driving the actuator.

Preferably, the identification unit identifies the control mode of the communication signal as any of a plurality of control modes including at least the P-iris control mode.

As in the aspect, it is also possible to apply the present invention to a diaphragm mechanism in the P-iris control mode in which the iris control is performed by the pulse signal driven motor.

Preferably, the plurality of control modes include the P-iris control mode, the video iris control mode, and the DC iris control mode.

The aspect also enables control of the diaphragm mechanism in the P-iris control mode, in which the iris control is performed by the pulse signal driven motor, on the basis of a signal in the video iris control mode and a signal in the DC iris control mode.

Preferably, the plurality of terminals include a first terminal, a second terminal, a third terminal and a fourth terminal; the P-iris control mode enables communication of a signal input into a first phase of the pulse signal driven motor via the first terminal and the fourth terminal, and enables communication of a signal input into a second phase of the pulse signal driven motor via the second terminal and the third terminal; the video iris control mode enables use of the first terminal as a power supply terminal, enables communication of a video signal via the third terminal, and enables use of the fourth terminal as a ground terminal; and the DC iris control mode enables communication of a braking signal via the first terminal and the second terminal, and enables communication of a driving signal via the third terminal and the fourth terminal.

Preferably, the identification unit identifies the control mode of the communication signal as the P-iris control mode if each of voltage between the first terminal and the fourth terminal and voltage between the second terminal and the third terminal is higher than voltage determined on the basis of voltage of a pulse signal to drive the pulse signal driven motor and the signal communicated via the first terminal, the second terminal, the third terminal and the fourth terminal is a pulse signal.

Theses aspects enable appropriate identification of whether or not a transmission and reception signal (communication signal) is in conformity with the P-iris control mode.

Preferably, the identification unit identifies the control mode of the communication signal as the video iris control mode if voltage between the first terminal and the fourth terminal is higher than voltage determined on the basis of power supply voltage in the video iris control mode.

The aspect enables appropriate identification of whether or not the transmission and reception signal (communication signal) is in conformity with the video iris control mode.

Preferably, the identification unit identifies the control mode of the communication signal as the DC iris control mode if voltage between the third terminal and the fourth terminal is higher than voltage determined on the basis of driving signal voltage in the DC iris control mode and the signal communicated via the third terminal and the fourth terminal is a direct current signal.

The aspect enables appropriate identification of whether or not the transmission and reception signal (communication signal) is in conformity with the DC iris control mode.

Another aspect of the present invention is related to a method for controlling a diaphragm device for a video camera lens interchangeably attached to a video camera body outputting a pulse signal for diaphragm control and a video camera body outputting a signal for diaphragm control different from the pulse signal, the diaphragm device for the video camera lens comprising: a diaphragm mechanism for adjusting an amount of diaphragm of the lens; an actuator including a pulse signal driven motor for driving the diaphragm mechanism according to an input pulse signal; and a connector connected to the video camera body and including a plurality of terminals enabling communication with the video camera body, the method including the steps of: identifying a control mode of a communication signal on the basis of voltage of the communication signal communicated via the plurality of terminals; obtaining a pulse signal on the basis of the identified control mode of the communication signal; and outputting the obtained pulse signal to the actuator.

Preferably, the plurality of terminals include a first terminal, a second terminal, a third terminal and a fourth terminal; the P-iris control mode enables communication of a signal input into a first phase of the pulse signal driven motor via the first terminal and the fourth terminal, and enables communication of a signal input into a second phase of the pulse signal driven motor via the second terminal and the third terminal; the video iris control mode enables use of the first terminal as a power supply terminal, enables communication of a video signal via the third terminal, and enables use of the fourth terminal as a ground terminal; the DC iris control mode enables communication of a braking signal via the first terminal and the second terminal, and enables communication of a driving signal via the third terminal and the fourth terminal; and the step of identifying the control mode of a communication signal includes the steps of totally closing the diaphragm once by adjusting the amount of the diaphragm by the diaphragm mechanism, and detecting a communication signal communicated via the first terminal, the second terminal, the third terminal and the fourth terminal after total closing of the diaphragm.

The aspect enables accurate detection of signal voltage because the step of detecting a signal communicated via the plurality of terminals (input/output unit) is performed after total closing of the diaphragm for the video camera lens, and thereby enables accurate identification of the control mode. Especially, this aspect works on detection of whether or not a control mode is the DC iris control mode.

The present invention enables control of driving a pulse signal driven actuator on the basis of a signal other than a pulse signal because a pulse signal is generated even if the signal different from the pulse signal is transmitted and received via the plurality of terminals.

DETAILED DESCRIPTION OF THE PREFERRED EMBODIMENTS

Embodiments of the present invention will be explained below referring to the attached drawings.

Figure 1:
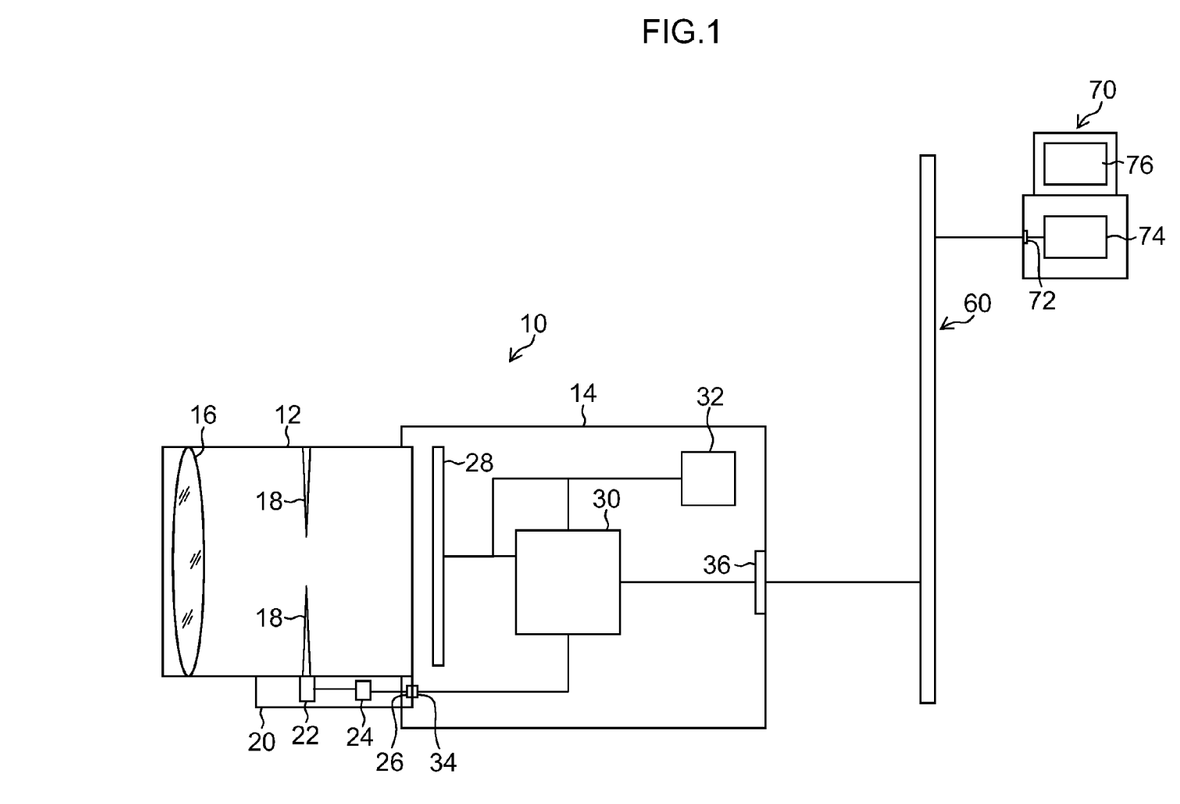
FIG. 1 is a block diagram designating an overview of a video camera connected with a management station via a network.

FIG. 1 is a block diagram designating an overview of a video camera connected with a management station via a network.

A video camera 10 capable of taking still images and moving images comprises an interchangeable lens unit 12 (diaphragm device for a video camera lens), and a video camera body 14 including an imaging element 28. The lens unit 12 and the video camera body 14 are electrically connected via a lens unit connector 26 of the lens unit 12 and a camera body connector 34 of the video camera body 14. The lens unit 12 can be interchangeably attached to the video camera body 14 outputting a pulse signal for diaphragm control and the video camera body 14 outputting a signal for diaphragm control different from the pulse signal.

The lens unit 12 comprises an optical system including a lens 16, an iris (diaphragm) 18, a filter (not designated) and the like, and an optical system operation unit 20 for controlling the optical system. The optical system operation unit 20 includes a lens unit controller 24 connected with the lens unit connector 26, and the lens unit controller 24 is connected with an iris actuator (pulse signal driven actuator) 22 for driving the iris 18 and an actuator (not designated) for driving another optical system such as the lens 16.

The iris 18 is a diaphragm mechanism adjusting the amount of diaphragm of the lens 16 and composed of a plurality of diaphragm blades. These diaphragm blades are driven by the iris actuator 22, and able to adjust the amount of diaphragm from a "position where entrance of light is not blocked (open position)" to a "position where the diaphragm blades are closed as much as possible so that entrance of light is blocked (for example, a position where the diaphragm blades are completely closed) (closed position)."

The lens unit controller 24 controls the optical system via the actuator on the basis of a control signal transmitted by the video camera body 14 via the lens unit connector 26, and performs, for example, focus control and zoom control by lens movement and diaphragm amount control of the iris 18 via the iris actuator 22.

The iris actuator 22 in the embodiment includes a pulse signal driven motor for driving the iris 18 (diaphragm mechanism) according to an input pulse signal. As such a pulse signal driven motor, for example, a stepping motor is preferably usable. In the following explanation, an explanation will be given about an example of using the lens unit 12 in a so-called "P-iris control mode (first control mode) in which the iris actuator 22 includes a stepping motor.

Stepping motors operate in synchronization with pulse power, and can perform accurate positioning control. A stepping motor of the example includes a first phase (+A phase and −A phase) and a second phase (+B phase and −B phase), and is able to rotate the motor to a desired angle by changing a signal input pattern to ports of coils (+A phase, −A phase, +B phase and −B phase) forming the respective phases.

The lens unit connector 26 is connected to the video camera body 14 (camera body connector 34), and includes a plurality of terminals (a first terminal to a fourth terminal) enabling communication with the video camera body 14.

The imaging element 28 of the video camera body 14 includes a color filter such as RGB and an image sensor (such as a CMOS; Complementary MOS or CCD; Charge-Coupled Device), converts light of a subject image radiated via the optical system (such as the lens 16 and the iris 18) of the lens unit 12 into an electric signal, and transmits an image signal to a camera body controller 30.

The camera body controller 30 integrally controls the video camera body 14, and, for example, performs image processing of the image signal from the imaging element 28, generates a control signal to control the lens unit 12 and transmits it to the lens unit 12 (lens unit controller 24) via the camera body connector 34, and transmits image data before and after image processing to external apparatuses (management station 70 and the like) connected via an input/output interface 36.

The camera body controller 30 can perform any image processing according to need, and can perform sensor correction processing, image interpolation processing, color correction processing, sharpness processing, tone correction processing, exposure correction processing, MPEG compression processing, and the like.

Furthermore, the camera body controller 30 is connected with a camera body memory 32, and the camera body controller 30 saves and reads out data and the like to and from the camera body memory 32. The camera body memory 32 not only can save various types of data (data, a program, a processing parameter, etc.) such as captured image data and image processed image data, but also can be used as a data developing region and the like for calculation processing in the camera body controller 30. Furthermore, the camera body memory 32 may be configured as a built-in memory of the video camera body 14, may be configured as a removable memory, or may be localized in a network attached storage unit, personal computer, server, or the like.

Image data of which the camera body controller 30 has performed image processing is sent to the management station 70 via a network 60 connected with the input/output interface 36. Furthermore, a connection aspect of the input/output interface 36 of the video camera body 14 and a management station interface 72 with the network 60 may be wired connection or may be wireless connection.

The management station 70 is connected with the video camera 10 via the input/output interface 36 of the video camera body 14, the network 60 and the management station interface 72, and receives data and the like such as image data transmitted by the video camera body 14. A management station controller 74 connected with the management station interface 72 integrally controls the management station 70. For example, the management station controller 74 controls reception of image data from the video camera 10 and transmission of a driving control signal to the video camera 10, and performs image processing of the received image data.

The management station 70 includes a display 76, and processing contents and the like at the management station controller 74 are displayed on the display 76 according to need. A user inputs data and instructions into the management station controller 74 by operating an input unit (not designated) such as a keyboard while checking display on the display 76, and thereby is able to control the video camera 10 connected with the management station 70.

Thus, the user is also able to remotely control the video camera 10 via the management station 70. In other words, the user has the display 76 of the management station 70 display a photographic image by the video camera 10, and is able to remotely control an adjustment instruction of the video camera 10 (for example, exposure control, pan and tilt operation, still image photographing instruction, zoom control, and the like) by operating the input unit such as the keyboard while looking at the display on the display 76. Such remote operation can be achieved by coordinating the management station controller 74, the camera body controller 30, and the lens unit controller 24 so that operation of the video camera 10 is appropriately controlled on the basis of an instruction input from the user into the management station 70 (keyboard or the like). Each of these controllers (lens unit controller 24, camera body controller 30, and management station controller 74) comprises a circuit and the like necessary for control processing, and comprises, for example, a calculation processing circuit (CPU or the like) and a memory.

Note that the video camera 10 may be provided with one management station 70 via the network 60 or may be provided with a plurality of management stations 70.

The video camera 10 having the above-described configuration detects a situation in which the lens unit 12 and the video camera body 14 are appropriately connected with each other or not, and a type of the video camera body 14 when activated in order to establish an appropriate communication state between the camera body controller 30 and the lens unit controller 24. In addition, in the embodiment, "a control mode of the iris 18" is detected at the lens unit controller 24.

The detection is performed based on a signal transmitted and received between the lens unit connector 26 and the camera body connector 34 connected with each other.

Generally, as control modes of video cameras, a video iris control mode (second control mode), a DC iris control mode (third control mode), and the P-iris control mode (first control mode) are used. Because shapes of the lens unit connector 26 and the camera body connector 34 are common among these control modes, there are cases where the lens unit 12 and the video camera body 14 in conformity with different control modes from each other are connected.

Figure 2:
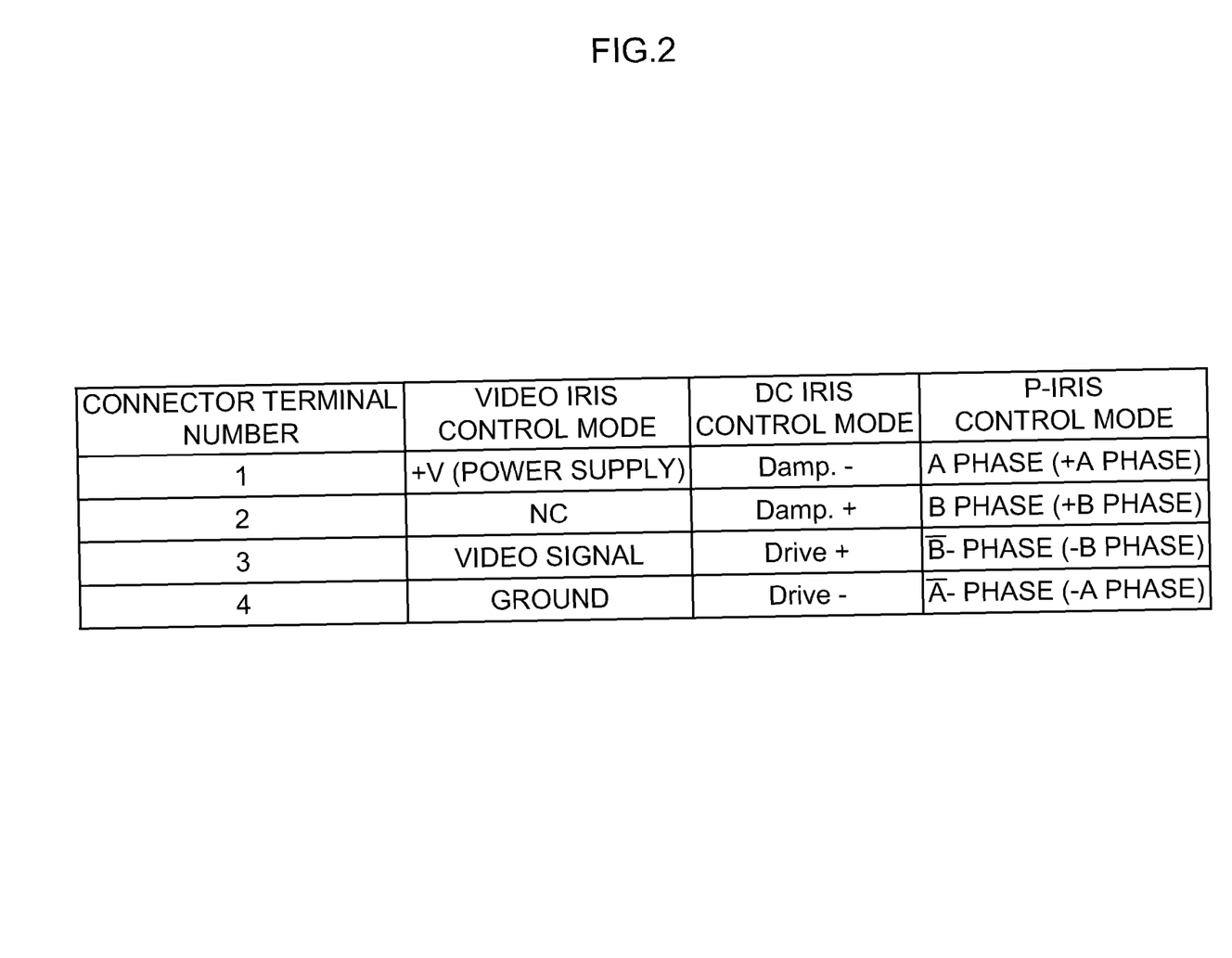
FIG. 2 is a diagram designating types of signals transmitted and received via respective terminals of a connector in a video iris control mode, a DC iris control mode, and a P-iris control mode.

FIG. 2 is a diagram designating signals transmitted and received via the respective terminals of the lens unit connector 26 in the video iris control mode, the DC iris control mode, and the P-iris control mode.

Generally, in each of the video iris control mode, the DC iris control mode, and the P-iris control mode, the lens unit connector 26 and the camera body connector 34 include four terminals (first terminal, second terminal, third terminal and fourth terminal). In the P-iris control mode, a signal input into the first phase (+A phase and −A phase) of the stepping motor (pulse signal driven motor) can be communicated via the first terminal and the fourth terminal, and a signal input into the second phase (+B phase and −B phase) of the stepping motor can be communicated via the second terminal and the third terminal.

In the video iris control mode, a signal (communication signal) includes a video signal, the first terminal can be used as a power supply terminal (+V), the second terminal is an unconnected terminal (NC), via the third terminal a video signal (image signal) can be communicated, and the fourth terminal can be used as a ground terminal (GND).

In the DC iris control mode, a signal (communication signal) includes a signal to control an actuator (analog signal driven actuator) that can be driven by an analog signal, a braking signal (Damp. − and Damp. +) can be communicated via the first terminal and the second terminal, and a driving signal (Drive + and Drive −) can be communicated via the third and the fourth terminal.

Thus, the lens unit 12 can be interchangeably attached not only to the video camera body 14 outputting a pulse signal for diaphragm control (stepping motor driving signal), but also to a video camera body outputting a signal for diaphragm control different from the pulse signal.

Generally, when the video camera body 14 in the P-iris control mode is connected to the lens unit 12 in the P-iris control mode using the stepping motor, the video camera body 14 can appropriately control operation of the lens unit 12. However, when the video camera body 14 in the DC iris control mode or the video iris control mode is connected to the lens unit 12 in the P-iris control mode, the lens unit controller 24 cannot appropriately control the iris actuator 22 on the basis of a reception signal because the signal in a different control mode is input into the lens unit connector 26.

Therefore, in the embodiment, the control mode of a signal (communication signal) transmitted and received between the video camera body 14 and the lens unit 12 via the camera body connector 34 and the lens unit connector 26 is identified as any of the control modes. If the control mode of the signal transmitted by the video camera body 14 is identified as the P-iris control mode, the iris actuator 22 is driven by the reception signal in the P-iris control mode. On the other hand, if the control mode of the signal transmitted by the video camera body 14 is identified as the video iris control mode or the DC iris control mode, the reception signal undergoes signal processing that converts it into a signal suitable to drive the iris actuator 22 (stepping motor), and the iris actuator 22 is driven by the signal after signal processing.

Figure 3:
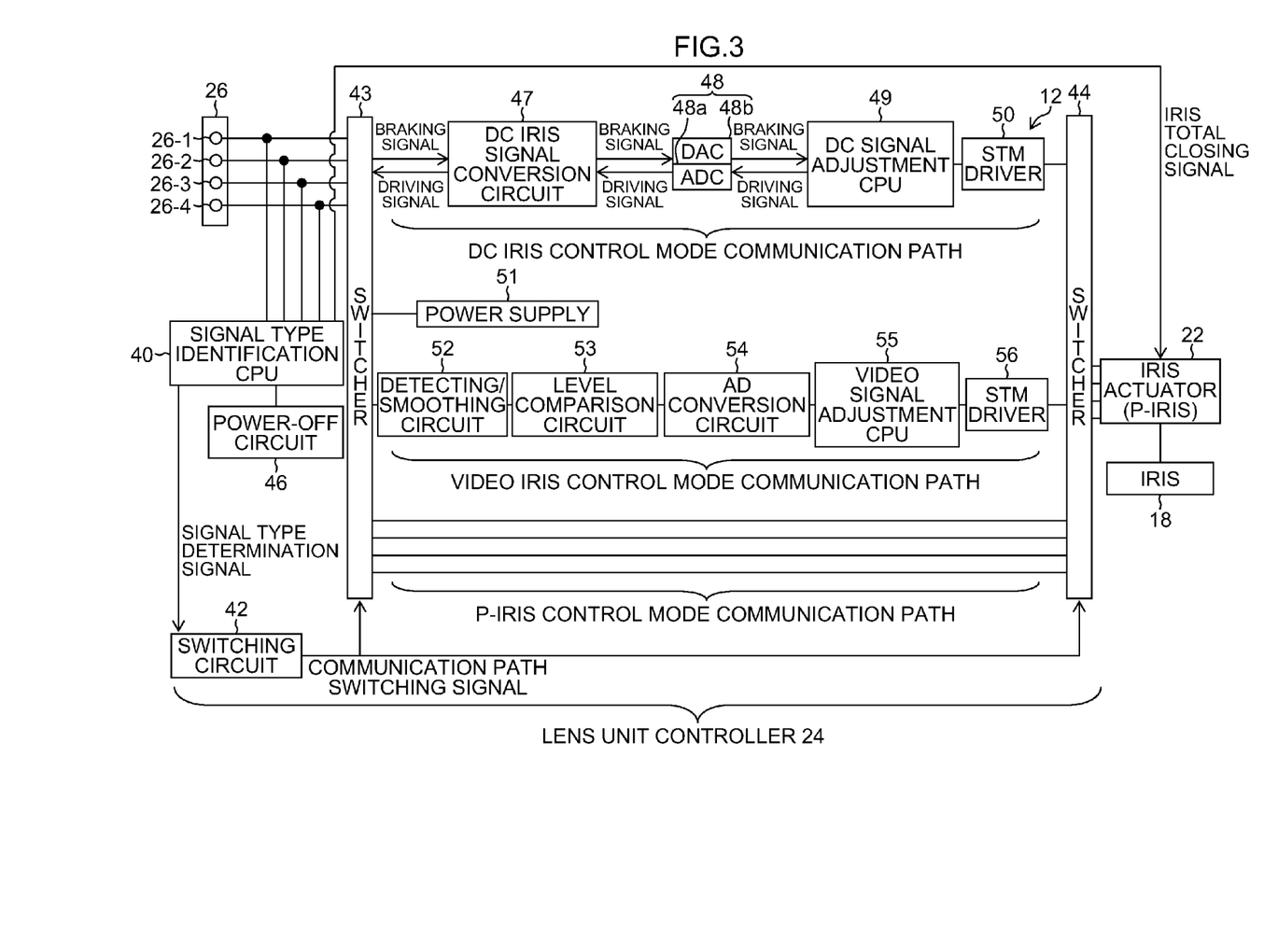
FIG. 3 is a block diagram designating functional configurations of iris control of a lens unit connector, a lens unit controller, and an iris actuator.

FIG. 3 is a block diagram designating functional configurations of iris control of the lens unit connector 26, lens unit controller 24, and iris actuator 22 of the lens unit 12.

A signal received via the lens unit connector 26 is output to the iris actuator 22 in the form of a stepping motor driving signal (pulse signal) through the lens unit controller 24.

The lens unit controller 24 functions as a control unit to control the iris actuator 22 by a pulse signal based on a signal received via the lens unit connector 26, and includes a signal type identification CPU (identification unit) 40, a switching circuit 42, a switcher 43, a switcher 44 (switching unit), and various signal processing units. The signal type identification CPU (identification unit) 40 identifies a signal type (control mode) on the basis of voltage of the signal transmitted and received via the lens unit connector 26. The switching circuit 42, the switcher 43 and the switcher 44 switch a communication path depending on the identified signal type (control mode). The signal processing units perform a variety of signal processing to obtain a pulse signal on the basis of the identified signal type (control mode).

The signal type identification CPU 40 identifies the control mode of a signal on the basis of voltage of the signal transmitted and received via a first terminal 26-1 to a fourth terminal 26-4 of the lens unit connector 26. The signal type identification CPU 40 of the example identifies the control mode of the signal as any of the P-iris control mode, the video iris control mode, and the DC iris control mode. Then, the signal type identification CPU 40 transmits a signal type determination signal indicating the identification result to the switching circuit 42.

The switching circuit 42 that has received the signal type determination signal transmits a communication path switching signal corresponding to the control mode of the signal identified by the signal type identification CPU 40 to the switcher 43 and the switcher 44, and switches the communication path. In the example, there is provided a communication path for a DC iris control mode signal, a communication path for the video iris control mode, and a communication path for the P-iris control mode. The switching circuit 42 controls the switcher 43 connected with the lens unit connector 26 and the switcher 44 connected with the iris actuator 22 to transmit the signal received via the lens unit connector 26 to a communication path corresponding to the identified control mode.

For example, if the control mode of the signal transmitted and received via the lens unit connector 26 is identified as the control mode (P-iris control mode) based on a pulse signal capable of directly driving the iris actuator 22, the switching circuit 42 controls the switcher 43 and the switcher 44 to switch the communication path so that the signal from the video camera body 14 is output to the iris actuator 22 skipping the signal processing units (see a "P-iris control mode communication path" in FIG. 3). On the other hand, if the control mode of the signal transmitted and received via the lens unit connector 26 is identified as one based on a control mode (DC iris control mode or video iris control mode) incapable of directly driving the iris actuator 22, the switching circuit 42 controls the switcher 43 and the switcher 44 to switch the communication path so that a pulse signal capable of driving the iris actuator 22 is generated by the signal processing units on the basis of the signal (control mode of the signal) and output to the iris actuator 22 (see a "DC iris control mode communication path" and a "video iris control mode communication path" in FIG. 3).

The signal processing units perform signal processing to obtain a "stepping motor driving pulse signal" corresponding to the identified control mode.

In this example, there are provided signal processing units specific to the respective DC iris control mode communication path and video iris control mode communication path in order to perform signal processing that converts a signal in the DC iris control mode and a signal in the video iris control mode into a stepping motor driving pulse signal.

For example, the DC iris control mode communication path is sequentially provided with, between the switcher 43 and the switcher 44, as the signal processing units, a DC iris signal conversion circuit 47, an analog/digital converter 48 (ADC 48a and DAC 48b), a DC signal adjustment CPU 49, and a stepping motor driver (STM driver) 50. In addition, the video iris control mode communication path is sequentially provided with, between the switcher 43 and the switcher 44, as the signal processing units, a power supply 51, a detecting/smoothing circuit 52, a level comparison circuit 53, an AD conversion circuit 54, a video signal adjustment CPU 55, and a stepping motor driver 56.

If the video camera body 14 is based on the DC iris control mode and a signal in the DC iris control mode has been received via the lens unit connector 26, the signal type identification CPU 40 identifies the control mode of the reception signal as the DC iris control mode, and the switching circuit 42, the switcher 43 and the switcher 44 switch the communication path to the DC iris control mode communication path. Then, in the DC iris control mode communication path, the DC iris signal conversion circuit 47 performs signal conversion processing of a transmission and reception signal (driving signal and braking signal), and in the analog/digital converter 48, the ADC 48a converts the driving signal from an analog signal into a digital signal, and the DAC 48b converts the braking signal from a digital signal into an analog signal.

Then, the DC signal adjustment CPU 49 converts the driving signal in the digital signal form into a pulse signal for the iris actuator (stepping motor) 22 in order to perform appropriate control (diaphragm control) of the iris 18. In other words, the DC signal adjustment CPU 49 functions as a signal generating unit for generating a pulse signal on the basis of the signal (transmission and reception signal). Then, the stepping motor driver (STM driver) 50 adjusts the pulse signal to a specific signal (first phase signal and second phase signal) capable of driving the iris actuator 22, and the signal after adjustment is output to the iris actuator 22 via the switcher 44.

Furthermore, in the DC iris control mode, driving voltage based on a luminance signal obtained from a video signal at the video camera body 14 is input into the lens unit 12 side, and a braking signal (braking voltage) corresponding to rotation speed of the motor is input into the video camera body 14 side. The video camera body 14 side performs feedback control to adjust the driving voltage taking the input braking voltage into consideration. Thus, even if the actual iris 18 is in conformity with the "P-iris control mode," it is necessary to make the video camera body 14 side (camera body controller 30) believe as if the video camera body 14 were controlling the "iris 18 (lens unit 12) in the DC iris control mode." Therefore, the DC signal adjustment CPU 49 calculates a braking signal in a suitable manner, and the braking signal is transmitted to the camera body controller 30 via the DAC 48b, DC iris signal conversion circuit 47, switcher 43, lens unit connector 26, and camera body connector 34, and used as a feedback signal of a servo circuit at the camera side.

On the other hand, if the video camera body 14 is based on the video iris control mode and a signal in the video iris control mode has been received via the lens unit connector 26, the signal type identification CPU 40 identifies the control mode of the reception signal as the video iris control mode, and the switching circuit 42, the switcher 43 and the switcher 44 switch the communication path to the video iris control mode communication path. In the video iris control mode communication path, a voltage signal from the first terminal 26-1 and the fourth terminal 26-4 is supplied to the power supply 51. In addition, a video signal (luminance signal) received via a third terminal 26-3 is converted into a direct current by detecting and smoothing at the detecting/smoothing circuit 52, and the level comparison circuit 53 compares a voltage level of the video signal converted into the direct current with a voltage level of a reference signal, and generates a "driving signal (iris driving signal based on the video signal) corresponding to an open/close direction and the amount of actuation of the diaphragm. The driving signal is converted from an analog signal into a digital signal at the AD conversion circuit 54, and further converted from the signal in the digital signal form into a pulse signal for the iris actuator (stepping motor) 22 at the video signal adjustment CPU 55 in order to perform appropriate control (diaphragm control) of the iris 18. In other words, the video signal adjustment CPU 55 functions as a signal generating unit for generating a pulse signal on the basis of the signal (transmission and reception signal). Then, the stepping motor driver 56 adjusts the pulse signal to a specific signal (first phase signal and second phase signal) capable of driving the iris actuator 22, and the signal after adjustment is output to the iris actuator 22 via the switcher 44.

Thus, the lens unit controller 24 including the signal type identification CPU 40 and the signal processing units can output a pulse signal to the iris actuator 22 on the basis of a signal communicated via the first terminal 26-1 to the fourth terminal 26-4.

Figure 4:
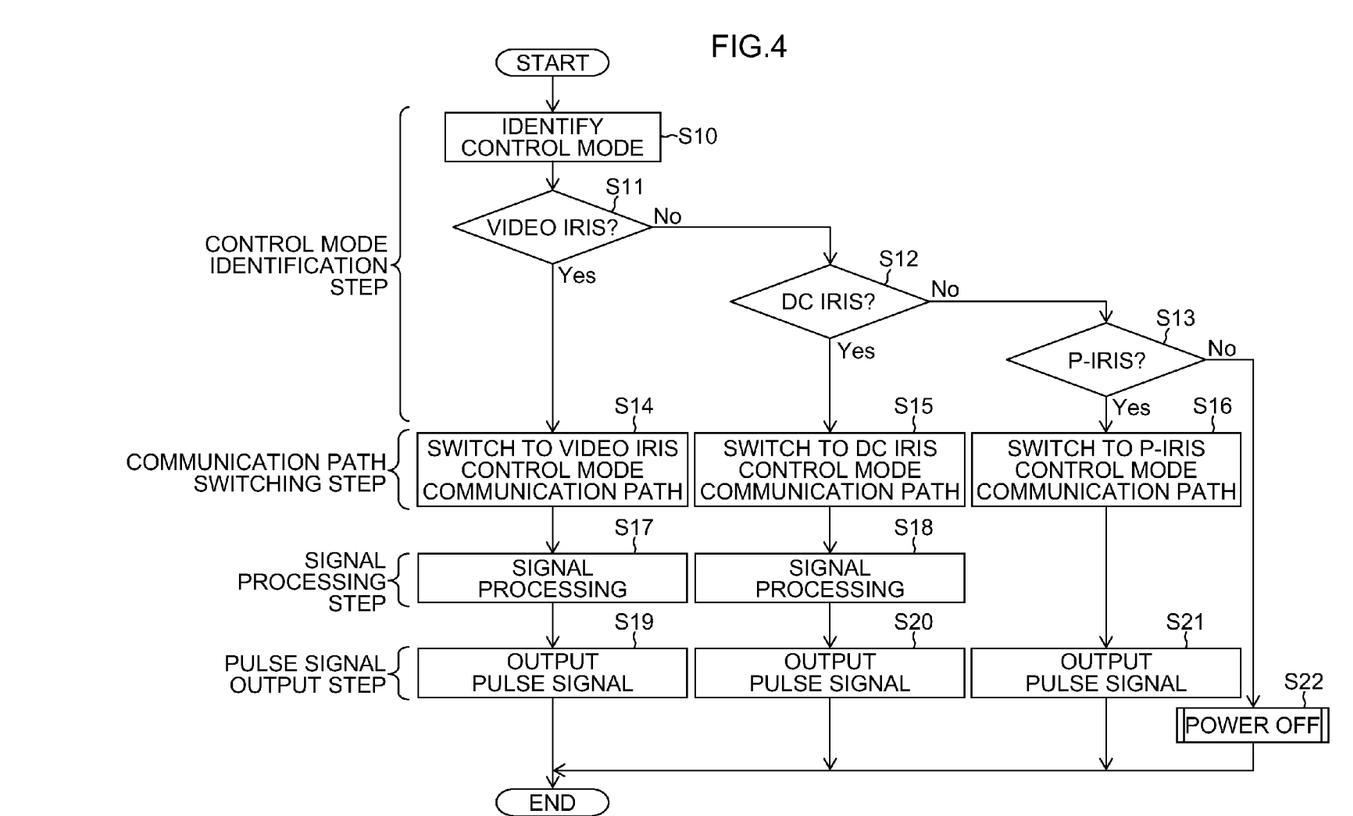
FIG. 4 is a flowchart designating a flow of processing from signal reception to signal output at the lens unit controller.

FIG. 4 is a flowchart designating a flow of processing from signal reception to signal output at the lens unit controller 24.

A method for controlling a diaphragm at the lens unit controller 24 in the example includes the steps of: identifying the control mode of an iris control signal received via the lens unit connector 26; switching a communication path depending on the identified control mode; performing signal processing corresponding to the identified control mode; and outputting a pulse signal to the iris actuator 22.

First, the signal type identification CPU 40 identifies the control mode of a signal transmitted and received via the lens unit connector 26 (S10 in FIG. 4). In the example, the control mode of the signal is identified based on voltage of the signal communicated via the first terminal 26-1 to the fourth terminal 26-4. Furthermore, detail of an approach to identify the control mode of a signal will be described below (see FIG. 5).

If the identified control mode is the video iris control mode (Yes in S11), the switching circuit 42 controls the switcher 43 and the switcher 44 to open the video iris control mode communication path and to close the communication paths in the other control modes (S14).

If the identified control mode is not the video iris control mode (No in S11), but the DC iris control mode (Yes in S12), the switching circuit 42 controls the switcher 43 and the switcher 44 to open the DC iris control mode communication path and to close the communication paths in the other control modes (S15).

If the identified control mode is not the DC iris control mode (No in S12), but the P-iris control mode (Yes in S13), the switching circuit 42 controls the switcher 43 and the switcher 44 to open the P-iris control mode communication path and to close the communication paths in the other control modes (S16).

If the identified control mode is not the P-iris control mode (No in S13), but another control mode (unidentified control mode) (No in S13), the signal type identification CPU 40 transmits an error signal indicating being unable to cope to the camera body controller 30 via the lens unit connector 26 and the camera body connector 34, and transmits a power-off signal to a power-off circuit 46 to power off the lens unit 12 (S22). The camera body controller 30 that has received the error signal transmits an error signal to the management station 70 to notify the user that a combination of the lens unit 12 and the video camera body 14 is inappropriate.

Then, if the communication path is switched to the video iris control mode communication path (S14) or switched to the DC iris control mode communication path (S15), a pulse signal for driving the iris actuator 22 is generated by signal processing at the signal processing units (see FIG. 3) provided on the respective communication paths (S17 and S18).

In other words, a signal in the video iris control mode undergoes signal processing through the power supply 51, detecting/smoothing circuit 52, level comparison circuit 53, AD conversion circuit 54, video signal adjustment CPU 55, and stepping motor driver 56, and changes into a pulse signal to drive the iris actuator 22 (stepping motor). In addition, a signal in the DC iris control mode undergoes signal processing through the DC iris signal conversion circuit 47, analog/digital converter 48 (ADC 48a and DAC 48b), DC signal adjustment CPU 49, and stepping motor driver 50, and changes into a pulse signal to drive the iris actuator 22 (stepping motor).

Thus, the pulse signal generated from the signal in the video iris control mode or the signal in the DC iris control mode is output to the iris actuator 22 via the switcher 44 (S19 and S20).

Furthermore, if the signal is identified as a signal in the P-iris control mode and the communication path is switched to the P-iris control mode communication path (S16), the reception signal via the lens unit connector 26 is determined to be an appropriate pulse signal as a control signal of the iris actuator 22, and output to the iris actuator 22 (S21) without undergoing the above-described signal processing (S17 or S18).

By a series of processing as described above, a pulse signal suitable to drive the stepping motor is input into the iris actuator 22, and the iris actuator 22 controls the iris 18 according to the input pulse signal, and achieves a desired amount of diaphragm.

Next, a specific approach to identify the control mode will be explained.

Figure 5:
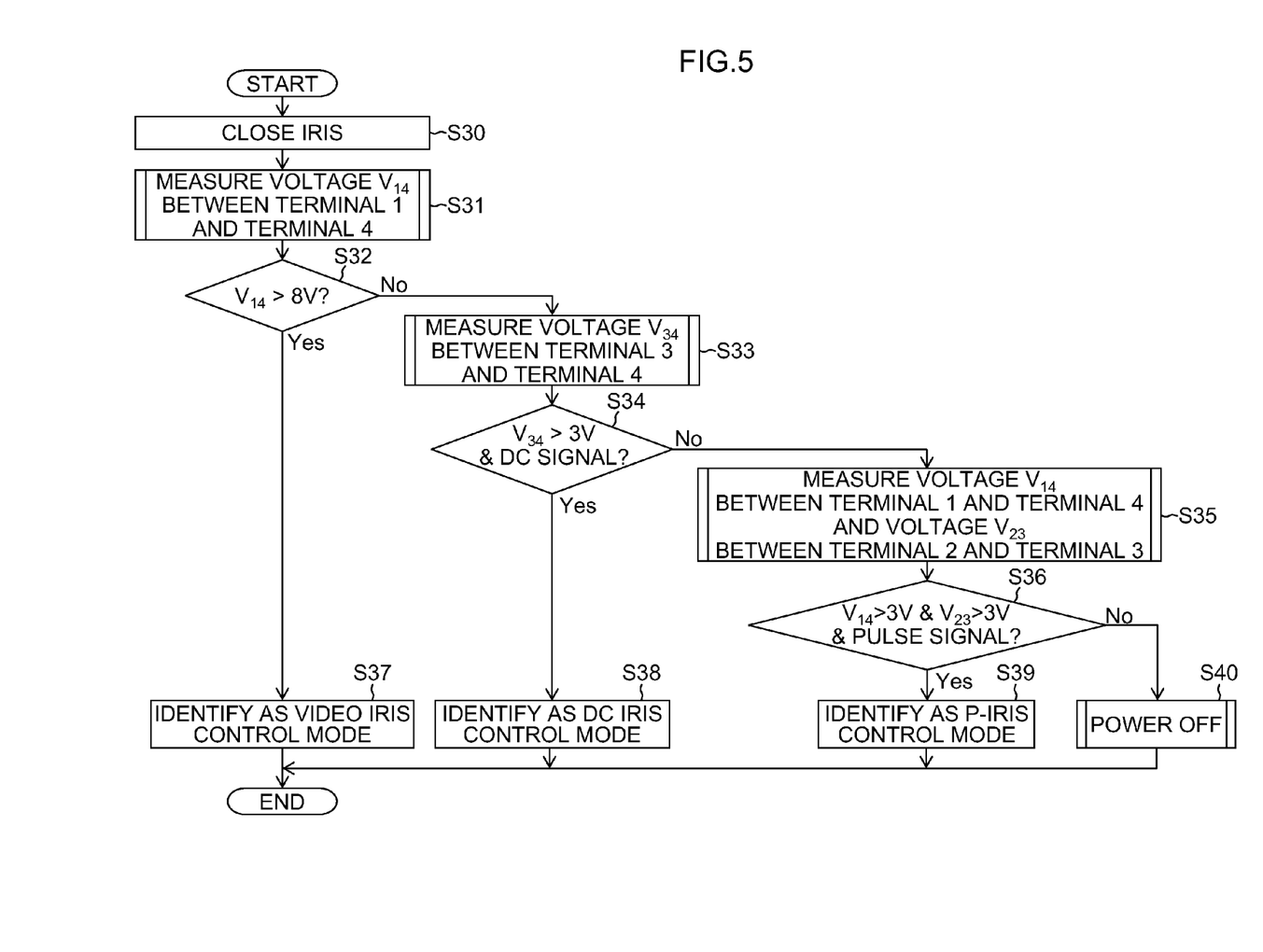
FIG. 5 is a flowchart designating one example of a control mode identification step.

FIG. 5 is a flowchart designating one example of a control mode identification step.

The following identification step is desirable to be automatically executed without relying on an instruction from a user via the management station 70 when the lens unit 12 and the video camera body 14 are activated in a connected state, but may be executed in response to an instruction from the user via the management station 70.

When the control mode of a signal communicated via the lens unit connector 26 is identified (control mode identification step), first the iris 18 (see FIG. 1) adjusts the amount of diaphragm, and the diaphragm for the video camera lens is totally closed once (S30 in FIG. 5). In other words, before going into specific identification processing for the control mode of the signal, the signal type identification CPU 40 transmits a pulse signal (iris total closing instruction signal) to totally close the iris 18 to the iris actuator 22, and thereby totally closes the iris 18.

When the iris 18 is totally closed (closed state), image data (video signal) obtained by photographing becomes close to a black level. Thus, in such a case, voltage of the iris driving signal becomes high (for example, indicating the highest value) under an auto iris control mode (especially, the DC iris control mode). This enables accurate execution of the following determination (especially, determination of the DC iris control mode) to identify the control mode of a signal on the basis of voltage of the signal received via the respective terminals of the lens unit connector 26.

The signal type identification CPU 40 detects a signal (communication signal) communicated via the first terminal 26-1 to the fourth terminal 26-4 after total closing of the diaphragm for the video camera lens, and detects and measures signal voltage $V_{14}$ between the first terminal 26-1 and the fourth terminal 26-4 (S31).

The signal type identification CPU 40 determines whether or not the signal voltage $V_{14}$ (absolute value) between the first terminal 26-1 and the fourth terminal 26-4 of the lens unit connector 26 is higher than predetermined value determined on the basis of power supply voltage in the video iris control mode (S32), and identifies the control mode of the signal from the video camera body 14 as the video iris control mode (S37) if it is higher than the predetermined voltage (Yes in S32).

This derives from a fact that power supply voltage determined by the voltage between the first terminal 26-1 and the fourth terminal 26-4 in the video iris control mode is higher than "voltage between the first terminal 26-1 (braking signal: Damp. −) and the fourth terminal 26-4 (driving signal: Drive −) in the DC iris control mode" and "voltage between the first terminal 26-1 (A phase signal: +A phase) and the fourth terminal 26-4 (A phase signal: −A phase) in the P-iris control mode."

Thus, the "predetermined voltage" used at the time of the determination (S32) should be lower than power supply voltage in the video iris control mode, and higher than voltage between the first terminal 26-1 and the fourth terminal 26-4 in the DC iris control mode and the P-iris control mode. In the example designated in FIG. 5, the "predetermined voltage" is set to 8 volts in light of the power supply voltage in the video iris control mode being about "9 volts to 12 volts" and the voltage between the first terminal 26-1 and the fourth terminal 26-4 in the DC iris control mode and the P-iris control mode being about "4 volts to 7 volts."

On the other hand, if the signal voltage $V_{14}$ between the first terminal 26-1 and the fourth terminal 26-4 is equal to or lower than the predetermined voltage (No in S32), the signal type identification CPU 40 detects and measures signal voltage $V_{34}$ between the third terminal 26-3 and the fourth terminal 26-4 (S33).

The signal type identification CPU 40 determines whether or not the signal voltage $V_{34}$ (absolute value) between the third terminal 26-3 and the fourth terminal 26-4 is higher than predetermined value determined on the basis of driving signal voltage in the DC iris control mode and a signal received via the third terminal 26-3 and the fourth terminal 26-4 is a direct current signal (DC signal) (S34). If these conditions are met (Yes in S34), the signal type identification CPU 40 identifies the control mode of the signal from the video camera body 14 as the DC iris control mode (S38).

This derives from a fact that the signal in the DC iris control mode is a direct current signal whereas the signal in the P-iris control mode is a pulse signal. In addition, the determination of whether or not the signal voltage $V_{34}$ is higher than the "predetermined voltage determined on the basis of the driving signal voltage in the DC iris control mode" has an objective to mainly exclude an impact of a noise signal, and the predetermined voltage should be lower than the driving signal voltage in the DC iris control mode and higher than exclusion object noise signal voltage. In the example designated in FIG. 5, the "predetermined voltage" is set to 3 volts in light of the driving signal voltage in the DC iris control mode being about "4 volts."

Furthermore, "whether or not the signal received via the third terminal 26-3 and the fourth terminal 26-4 is a direct current signal (DC signal)" can be determined by any approach, and, for example, the signal can be determined to be a direct current signal if the signal received via the third terminal 26-3 and the fourth terminal 26-4 indicates equal to or higher than a certain voltage value for a certain time (for example about 3 seconds). This is based on being able to determine whether or not a signal is a direct current signal by checking to see that the signal is not a pulse signal indicating instantaneous voltage increase behavior or voltage reduction behavior.

On the other hand, if the signal voltage $V_{34}$ between the third terminal 26-3 and the fourth terminal 26-4 is equal to or lower than the predetermined voltage described above or the signal received via the third terminal 26-3 and the fourth terminal 26-4 is not a direct current signal (No in S34), the signal type identification CPU 40 detects and measures the signal voltage $V_{14}$ between the first terminal 26-1 and the fourth terminal 26-4 and signal voltage $V_{23}$ between the second terminal 26-2 and the third terminal 26-3 (S35).

The signal type identification CPU 40 determines whether or not each (absolute value) of the signal voltage $V_{14}$ between the first terminal 26-1 and the fourth terminal 26-4 and the signal voltage $V_{23}$ between the second terminal 26-2 and the third terminal 26-3 is higher than predetermined voltage determined on the basis of voltage of the driving pulse signal of the iris actuator 22 (stepping motor), and a signal communicated via the first terminal 26-1, the second terminal 26-2, the third terminal 26-3 and the fourth terminal 26-4 is a pulse signal (S36). If these conditions are met (Yes in S36), the signal type identification CPU 40 identifies the control mode of the signal from the video camera body 14 as the P-iris control mode (S39).

This derives from a fact that a driving signal in the P-iris control mode (stepping motor driving signal) is a pulse signal, and voltage of such a pulse signal is about "4 volts." In addition, the determination of whether or not each of the signal voltage $V_{14}$ and the signal voltage $V_{23}$ is higher than the "predetermined voltage determined on the basis of voltage of the driving pulse signal of the iris actuator 22 (stepping motor)" has an objective to mainly exclude an impact of a noise signal, and the predetermined voltage should be lower than driving signal voltage of the stepping motor in the P-iris control mode and higher than exclusion object noise signal voltage. In the example designated in FIG. 5, the "predetermined voltage" is set to 3 volts in light of the driving signal voltage in the P-iris control mode being about "4 volts."

If one or both of the "signal voltage $V_{14}$ between the first terminal 26-1 and the fourth terminal 26-4" and the "signal voltage $V_{23}$ between the second terminal 26-2 and the third terminal 26-3" are equal to or lower than the predetermined voltage described above, or the signal is not a pulse signal (No in S36), the signal communicated via the respective terminals of the lens unit connector 26 is determined to be none of the video iris control mode, the DC iris control mode, and the P-iris control mode. In this case, the signal type identification CPU 40 transmits an error signal to the camera body controller 30, and transmits a power-off signal to the power-off circuit 46 to power off the lens unit 12 (S40: see S22 in FIG. 4).

As explained above, the lens unit 12 (lens unit controller 24) in the embodiment is able to control the iris 18 to a desired amount of diaphragm by controlling drive of the lens unit 12 (iris actuator 22) in the P-iris control mode even if an iris control signal from the video camera body 14 is in the DC iris control mode or the video iris control mode.

Note that the above-described examples are only examples, and the present invention can be applied to other configurations capable of producing similar operation effects. Each of the above-described processing circuits can be suitably implemented by a variety of hardware, software (programs), or combination of both, and a plurality of processing circuits can be also implemented by a single configuration circuit.

Therefore, for example, in FIG. 3, the signal type identification CPU 40, the DC signal adjustment CPU 49, and the video signal adjustment CPU 55 are designated as separate functional configurations, but it is also possible to implement the CPUs designated in FIG. 3 by a single CPU. In addition, a similar thing is applied to the stepping motor driver 50 and the stepping motor driver 56 in FIG. 3, and a single driver is able to embody these drivers.

In addition, for the iris actuator 22, it is also possible to adopt another type of pulse signal driven motor (ultrasonic motor or the like).

What is claimed is:

1. A diaphragm device for a video camera lens interchangeably attached to a video camera body outputting a pulse signal for diaphragm control and a video camera body outputting a signal for diaphragm control different from the pulse signal, comprising:
   a diaphragm mechanism which adjusts an amount of diaphragm of a lens;
   a pulse signal driven actuator which drives the diaphragm mechanism according to an input pulse signal;
   a connector connected to a video camera body and including a plurality of terminals enabling communication with the video camera body;
   an identification unit which identifies a control mode of a signal communicated via the plurality of terminals on the basis of voltage of the signal; and
   a control unit that includes a switching unit which switches a communication path of the signal depending on the identified control mode and that controls the pulse signal driven actuator by a pulse signal based on the signal, wherein:
   the switching unit switches the communication path so that a pulse signal capable of driving the pulse signal driven actuator is generated by a signal generating unit for generating the pulse signal on the basis of the signal, and output to the pulse signal driven actuator if the control mode of the signal is identified as one based on a control mode incapable of directly driving the pulse signal driven actuator; and
   the switching unit switches the communication path so that the signal is output to the pulse signal driven actuator if the control mode of the signal is identified as a first control mode based on a pulse signal capable of directly driving the pulse signal driven actuator.

2. The diaphragm device for the video camera lens according to claim 1, wherein the control mode incapable of directly driving the pulse signal driven actuator includes a second control mode, the signal therein including a video signal, and a third control mode, the signal therein including a signal to control an analog signal driven actuator.

3. The diaphragm device for the video camera lens according to claim 2, wherein
   the plurality of terminals include a first terminal, a second terminal, a third terminal and a fourth terminal;
   the first control mode enables communication of a signal input into a first phase of the pulse signal driven actuator via the first terminal and the fourth terminal, and enables communication of a signal input into a second phase of the pulse signal driven actuator via the second terminal and the third terminal;
   the second control mode enables use of the first terminal as a power supply terminal, enables communication of a video signal via the third terminal, and enables use of the fourth terminal as a ground terminal; and
   the third control mode enables communication of a braking signal via the first terminal and the second terminal, and enables communication of a driving signal via the third terminal and the fourth terminal.

4. The diaphragm device for the video camera lens according to claim 3, wherein the identification unit identifies the control mode of the signal as the first control mode if each of voltage between the first terminal and the fourth terminal and voltage between the second terminal and the third terminal is higher than voltage determined on the basis of voltage of a pulse signal to drive the pulse signal driven actuator and the signal communicated via the first terminal, the second terminal, the third terminal and the fourth terminal is a pulse signal.

5. The diaphragm device for the video camera lens according to claim 3, wherein the identification unit identifies the control mode of the signal as the second control mode if voltage between the first terminal and the fourth terminal is higher than voltage determined on the basis of power supply voltage in the second control mode.

6. The diaphragm device for the video camera lens according to claim 3, wherein the identification unit identifies the control mode of the signal as the third control mode if voltage between the third terminal and the fourth terminal is higher than voltage determined on the basis of driving signal voltage in the third control mode and a signal communicated via the third terminal and the fourth terminal is a direct current signal.

7. A method for controlling a diaphragm device for a video camera lens interchangeably attached to a video camera body outputting a pulse signal for diaphragm control and a video camera body outputting a signal for diaphragm control different from the pulse signal, the diaphragm device for the video camera lens comprising: a diaphragm mechanism which adjusts an amount of diaphragm of a lens; a pulse signal driven actuator which drives the diaphragm mechanism according to an input pulse signal; a connector connected to the video camera body and including a plurality of terminals enabling communication with the video camera body; an identification unit which identifies a control mode of a signal communicated via the plurality of terminals on the basis of voltage of the signal; and a control unit that includes a switching unit which switches a communication path of the signal depending on the identified control mode and that controls the pulse signal driven actuator by a pulse signal based on the signal, the method including the steps of:
    identifying a control mode of a signal communicated via the plurality of terminals on the basis of voltage of the signal; and
    switching a communication path on the basis of the identified control mode of the signal, wherein:
    the switching unit switches the communication path so that a pulse signal capable of driving the pulse signal driven actuator is generated by a signal generating unit which generates the pulse signal on the basis of the signal, and output to the pulse signal driven actuator if the control mode of the signal is identified as one based on a control mode incapable of directly driving the pulse signal driven actuator; and
    the switching unit switches the communication path so that the signal is output to the pulse signal driven actuator if the control mode of the signal is identified as a first control mode based on a pulse signal capable of directly driving the pulse signal driven actuator.

8. The method for controlling the diaphragm device for the video camera lens according to claim 7, wherein
    the plurality of terminals include a first terminal, a second terminal, a third terminal and a fourth terminal;
    the first control mode enables communication of a signal input into a first phase of the pulse signal driven actuator via the first terminal and the fourth terminal, and enables communication of a signal input into a second phase of the pulse signal driven actuator via the second terminal and the third terminal;
    the second control mode enables use of the first terminal as a power supply terminal, enables communication of a video signal via the third terminal, and enables use of the fourth terminal as a ground terminal;
    the third control mode enables communication of a braking signal via the first terminal and the second terminal, and enables communication of a driving signal via the third terminal and the fourth terminal; and
    the step of identifying the control mode of the signal includes the steps of totally closing the diaphragm once by adjusting the amount of the diaphragm by the diaphragm mechanism, and detecting the signal communicated via the first terminal, the second terminal, the third terminal and the fourth terminal after total closing of the diaphragm.

* * * * *